(12) United States Patent
Hodgman

(10) Patent No.: US 11,374,954 B1
(45) Date of Patent: Jun. 28, 2022

(54) DETECTING ANOMALOUS NETWORK BEHAVIOR

(71) Applicant: Rapid7, Inc., Boston, MA (US)

(72) Inventor: Roy Hodgman, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 72 days.

(21) Appl. No.: 17/139,319

(22) Filed: Dec. 31, 2020

Related U.S. Application Data

(63) Continuation of application No. 16/005,799, filed on Jun. 12, 2018, now Pat. No. 10,965,699.

(60) Provisional application No. 62/622,181, filed on Jan. 26, 2018.

(51) Int. Cl.
| | | |
|---|---|---|
| *H04L 29/06* | (2006.01) | |
| *H04L 9/40* | (2022.01) | |
| *H04L 43/0876* | (2022.01) | |
| *H04L 43/04* | (2022.01) | |

(52) U.S. Cl.
CPC ...... *H04L 63/1425* (2013.01); *H04L 43/0876* (2013.01); *H04L 63/1416* (2013.01); *H04L 63/1433* (2013.01); *H04L 63/20* (2013.01); *H04L 43/04* (2013.01)

(58) Field of Classification Search
CPC . H04L 63/1425; H04L 63/20; H04L 63/1433; H04L 63/1416; H04L 43/0876; H04L 43/04
See application file for complete search history.

(56) References Cited

U.S. PATENT DOCUMENTS

| | | | |
|---|---|---|---|
| 7,493,659 B1* | 2/2009 | Wu | H04L 63/1416 726/26 |
| 9,686,296 B1* | 6/2017 | Murchison | H04L 63/08 |
| 2011/0149736 A1* | 6/2011 | Kashyap | H04L 63/1416 370/235 |
| 2013/0298184 A1* | 11/2013 | Ermagan | G06F 21/54 726/1 |

(Continued)

OTHER PUBLICATIONS

Ogasawara et al., "Adaptive Normalization: A Novel Data Normalization Approach for Non-Stationary Time Series", Proceedings of the International Joint Conference on Neural Networks. 1-9. 10.11. 09/IJCNN.2, Published Jul. 2010. (Year: 2010).

*Primary Examiner* — Chau Le
(74) *Attorney, Agent, or Firm* — Ashwin Anand

(57) ABSTRACT

Approaches provide for monitoring attempted network activity such as network port connections and corresponding payloads of network data obtained by a network device and, based on the attempted connections and/or payloads, identifying malicious network activity in real time. For example, network activity obtained from a plurality of network devices in a service provider environment can be monitored to attempt to detect compliance with appropriate standards and/or any of a variety of resource usage guidelines (e.g., network behavioral standards or other such rules, guidelines, or network behavior tests) based at least in part on network port connection activity with respect to at least one network device. If it is determined that network activity is not in compliance with the usage guidelines, or other such network behavior test, the system can take one or more remedial actions, which can include generating a notification identifying the malicious network activity.

19 Claims, 6 Drawing Sheets

(56) References Cited

U.S. PATENT DOCUMENTS

| | | | |
|---|---|---|---|
| 2015/0215334 A1* | 7/2015 | Bingham | H04L 63/1425 726/23 |
| 2018/0139236 A1* | 5/2018 | Hodgman | H04L 63/1408 |
| 2019/0166139 A1* | 5/2019 | Ochi | H04L 63/1408 |
| 2020/0014712 A1* | 1/2020 | Gusat | H04L 43/04 |

* cited by examiner

DETECTING ANOMALOUS NETWORK BEHAVIOR

CROSS REFERENCE TO RELATED APPLICATIONS

The present application claims the benefit of U.S. utility patent application Ser. No. 16/005,799, filed on Jun. 12, 2018, and issued as U.S. Patent No. 10,965,699, on Mar. 30, 2021, which claims priority to U.S. provisional application No. 62/622,181, filed Jan. 26, 2018, the entire disclosures of which are hereby incorporated by reference as if set forth in their entirety herein.

TECHNICAL FIELD

Embodiments of the invention relate generally to an alert system for analyzing and reporting anomalous internet traffic data and a method of analyzing the data, and more specifically to methods and systems for automatically generating an alert concerning anomalous data.

BACKGROUND

As an increasing number of applications and services are being made available over networks such as the internet, monitoring these networks is important to ensure reliable operation, fault detection, timely mitigation of potentially malicious activities, etc.

Many networks rely on network monitoring systems such as a honeypot network to monitor inbound internet traffic. These network monitoring systems collect network data and analyze the network data for information about attacks and other anomalous activities.

Conventional network monitoring systems typically require manually analyzing network data for information about malicious activity. Manual analysis can be time-consuming and inefficient. Further, manual analysis is susceptible to human error. Moreover, manual analysis can result in delays, as malicious behavior is identified only after it is discovered.

A need exists, therefore, for systems, methods, and devices that overcome this disadvantage.

SUMMARY

This summary is provided to introduce a selection of concepts in a simplified form that are further described below in the Detailed Description. This summary is not meant or intended to identify or exclude key features or essential features of the claimed subject matter, nor is it intended to be used as an aid in determining the scope of the claimed subject matter.

In one aspect, embodiments relate to a computing system that includes at least one computing device processor, wherein the at least one computing device processor enables the computing system to obtain data from a plurality of network devices in a service provider environment, the plurality of network devices available over a network, the data including network activity information for at least one network device of the plurality of network devices, determine port connection activity with respect to at least one network device based at least in part on the data, and generate a notification when the port connection activity satisfies at least one anomalous network behavior test.

In some embodiments, the system further comprises a management component configured to aggregate the data from the plurality of network devices, and a notification component configured to provide at least one notification.

In some embodiments, the at least one computing device processor further enables the computing system to analyze the data to identify data that satisfies at least one data criterion and store the identified data.

In some embodiments, the at least one computing device processor further enables the computing system to, for a port, of the plurality of network devices, over a period of time, determine a total number of connections to the port by the plurality of network devices, determine a number of network devices of the plurality of network devices capable of receiving data, normalize a connection count based at least in part on the total number of connections and the number of network devices to generate a normalized connection count, and store the normalized connection count as aggregated data.

In some embodiments, the at least one computing device processor further enables the computing system to aggregate the data across the plurality of network devices.

In some embodiments, the at least one computing device processor further enables the computing system to determine the port connection activity satisfies at least one anomalous network behavior test and detect one of a port volume increase anomaly or a port classification change anomaly, wherein the at least one anomalous network behavior test includes one of a port volume test or a port classification test.

In some embodiments, the network activity information includes at least one of timestamp information for port connection attempts, source IP information, destination IP information, destination port information, or connection protocol information.

In another aspect, embodiments relate to a computer-implemented method that includes obtaining data from a plurality of electronic resources in a service provider environment, the plurality of electronic resources available over a network, the data including network activity information for at least one electronic resource of the plurality of electronic resources, determining port connection activity with respect to at least one network device based at least in part on the data, and performing an action when the port connection activity satisfies at least one anomalous network behavior test.

In some embodiments, the action includes at least one of generating a notification for at least one user associated with the plurality of electronic resources, generating an alarm, or suspending operation of at least one operation on at least one of the plurality of electronic resources, and wherein the at least one anomalous network behavior test includes one of a port volume test or a port classification test.

In some embodiments, the method further includes for a port, of the plurality of electronic resources, over a period of time, obtaining a normalized number of connection attempts, using a smoothing technique associated with a first rolling window of a first size to determine a mean of the normalized number of connection attempts, using a distance technique to determine a distance between the mean of the normalized number of connection attempts and the normalized number of connection attempts, using the smoothing technique associated with a second rolling window of a second size to determine a standard deviation of the distance, and determining a ratio of the distance and the standard deviation.

In some embodiments, the method further includes determining the ratio exceeds a threshold to satisfy a port volume test of the at least one anomalous network behavior test, and generating an alert, the alert indicating a port volume increase anomaly.

In some embodiments, the method further includes for a port, of the plurality of electronic resources, over a period of time, segmenting connection attempts into a set of segments, classifying individual segments of the set of segments to generate a set of classified segments, and generating an alert based at least in part on the set of classified segments.

In some embodiments, the method further includes comparing a first classification of a first segment of the set of classified segments to a second classification of a second segment of the set of classified segments, determining the first classification and the second classification are different to satisfy a port classification test of the at least one anomalous network behavior test, and generating an alert indicating a port classification change when the first classification and the second classification are different.

In some embodiments, the method further includes determining for a port of the plurality of electronic resources a total number of connections to the port, determining a number of electronic resources of the plurality of electronic resources capable of receiving data, normalizing a connection count based at least in part on the total number of connections and the number of electronic resources to generate a normalized connection count, and storing the normalized connection count as aggregated data.

In some embodiments of the method, the network activity information includes at least one of timestamp information for port connection attempts, source IP information, destination IP information, destination port information, or connection protocol information.

In yet another aspect, at least one processor includes a non-transitory computer readable storage medium storing instructions that, when executed by at least one processor of a computing system, causes the computing system to obtain data from a plurality of electronic resources in a service provider environment, the plurality of electronic resources available over a network, the data including network activity information for at least one electronic resource of the plurality of electronic resources, determine port connection activity with respect to at least one network device based at least in part on the data, and perform an action when the port connection activity satisfies at least one anomalous network behavior test.

In some embodiments, the instructions of the non-transitory computer readable storage medium, when executed by the at least one processor further enables the computing system to, for a port, of the plurality of electronic resources, over a period of time, analyze the data to identify data that satisfies at least one data criterion, use the identified data to determine a total number of connections to the port by the plurality of electronic resources, determine a number of electronic resources of the plurality of electronic resources capable of receiving data, normalize a connection count based at least in part on the total number of connections and the number of electronic resources to generate a normalized connection count, and store the normalized connection count as aggregated data.

In some embodiments, the instructions of the non-transitory computer readable storage medium, when executed by the at least one processor, further enables the computing system to aggregate the data across the plurality of electronic resources.

In some embodiments, the network activity information of the non-transitory computer readable storage medium includes at least one of timestamp information for port connection attempts, source IP information, destination IP information, destination port information, or connection protocol information, and wherein the at least one anomalous network behavior test includes one of a port volume test or a port classification test.

In some embodiments, the instructions of the non-transitory computer readable storage medium, when executed by the at least one processor, further enables the computing system to determine the port connection activity satisfies at least one anomalous network behavior test, and detect one of a port volume increase anomaly or a port classification change anomaly.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
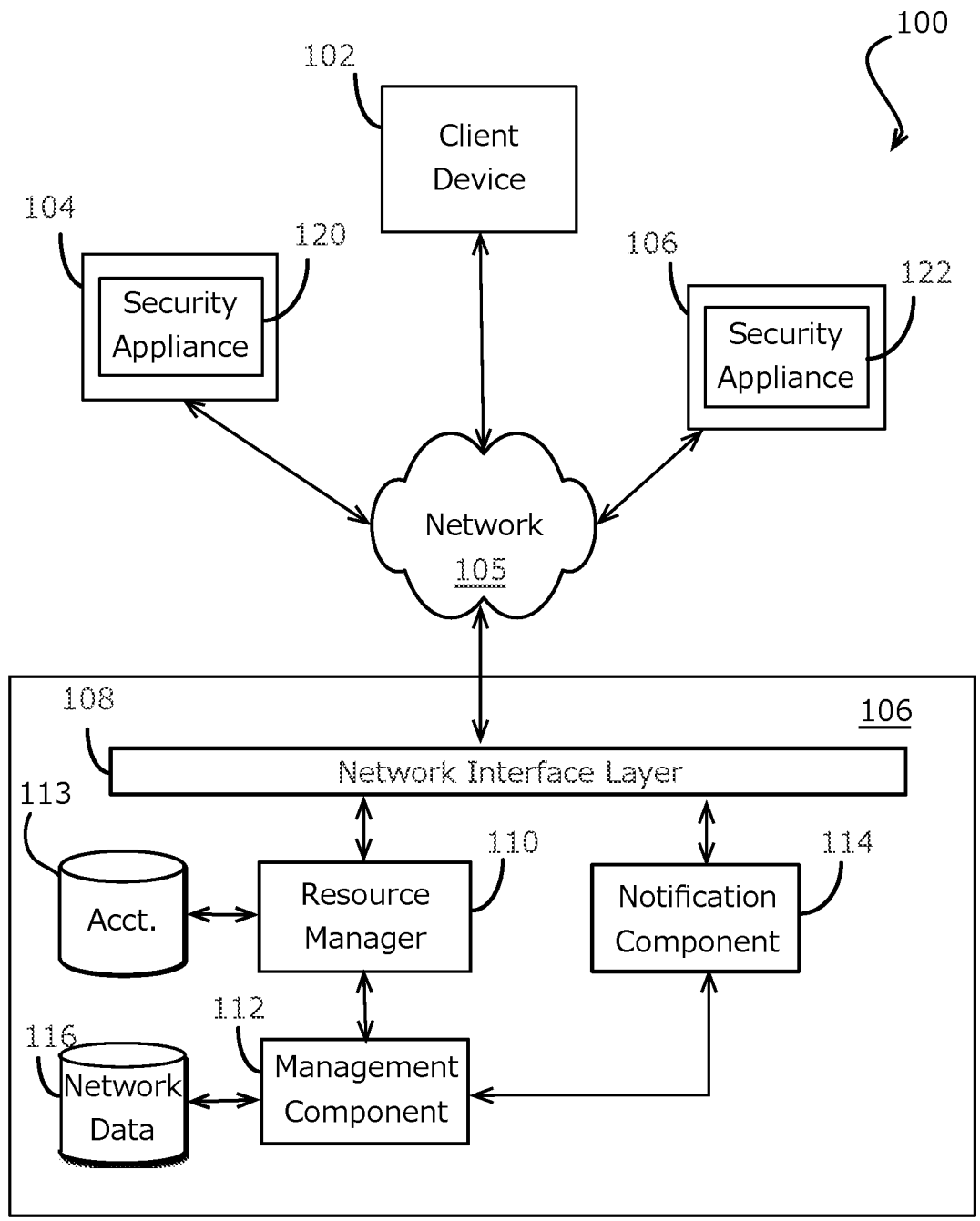
FIG. 1 illustrates an example environment in which aspects of the various embodiments can be implemented in accordance with an embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs and in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Systems and methods in accordance with various embodiments of the present disclosure may overcome one or more of the aforementioned and other deficiencies experienced in conventional approaches to analyzing network activity in an electronic environment. In particular, various embodiments are able to monitor attempted network activity such as network port connections and corresponding payloads of network data received by a network device and, based on the attempted connections and/or payloads, identify malicious network activity in real time. For example, in various embodiments, network activity obtained from a plurality of network devices in a service provider environment can be monitored to attempt to detect compliance with appropriate standards and/or any of a variety of resource usage guidelines (e.g., network behavioral standards or other such rules, guidelines, or network behavior tests) based at least in part on network port connection activity with respect to at least one network device. If it is determined that network activity is not in compliance with the usage guidelines, or other such network behavior test, the system can take one or more remedial actions, which can include generating a notification identifying the analyzed network activity as malicious.

In various embodiments, approaches allow for automatically detecting changes in network activity (e.g., internet traffic) without active user intervention and, in response to detecting the changes, communicating the detected changes and/or other such anomalous behavior to the user. Various types of behavior can be monitored, including, for example, anomalous behavior involving a network port of a network device or network data, where network data can include, for example, information from attempted network connections, including network port connections and payload information. The network device or honeypot can include a computing device that includes a processor and software instructions to monitor and collect network data, such as indiscriminate scanning behavior on the internet. Further, various remedial actions can be taken in response to detected anomalous behavior. For example, the anomalous behavior can simply be noted for later processing, or a user can be notified of the anomalous behavior.

Such a global view of network data obtained by a network of network devices can also enable the system to provide functionality beneficial to all users. For example, the system can determine the state of a network to determine optimal usage parameters for that network, such as the optimal volume of data and connections for a particular port. Such an approach can provide a starting point for more in-depth research about new network attacks, techniques of attack, and network vulnerabilities that can be utilized to determine techniques to mitigate such attacks or other malicious behavior. Such techniques also allow a system to quickly recover from certain network events, such as network attacks, congestion, or temporary network failure.

Various other advantages and functionality are described and suggested below with respect to the various embodiments.

FIG. 1 illustrates an example environment 100 in which aspects of the various embodiments can be implemented. In this example a user, such as an administrator or a customer of a provider of at least a portion of the environment, is able to utilize a client device 102 to communicate across at least one network 105 with a resource provider environment 106.

The client device 102 can include any appropriate electronic device operable to send and receive requests, messages, or other such information over an appropriate network 105 and convey information back to a user of the device. Examples of such client devices 102 include personal computers, tablet computers, smart phones, notebook computers, and the like.

The network(s) 105 can include any appropriate network, including an intranet, the internet, a cellular network, a local area network (LAN), or any other such network or combination, and communication over the network can be enabled via wired and/or wireless connections.

The resource provider environment 106 can include any appropriate components for receiving requests and returning information or performing actions in response to those requests. As an example, the provider environment 106 might include web servers and/or application servers for receiving and processing requests, then returning data, web pages, video, audio, or other such content or information in response to the request. While this example is discussed with respect to the internet, web services, and internet-based technology, it should be understood that aspects of the various embodiments can be used with any appropriate services available or offered over a network in an electronic environment.

In various embodiments, the provider environment 106 may include various types of resources that can be utilized for analyzing and reporting anomalous network activity. In this example, the provider environment 106 includes a management component 112 and a notification component 114. Although management component 112 and notification component 114 are shown as single components, the components may be hosted on multiple server computers and/or distributed across multiple systems. Additionally, the components may be performed by any number of different computers and/or systems. Thus, the components may be separated into multiple services and/or over multiple different systems to perform the functionality described herein.

In at least some embodiments, an application executing on the client device 102 that needs to access resources of the provider environment 106, for example, to manage network resources in response to malicious network activity, might be exposed as one or more services to which the application has subscribed, can submit a request that is received to an interface layer 108 of the provider environment 106. The interface layer 108 can include application programming interfaces (APIs) or other exposed interfaces enabling a user to submit requests, such as web service requests, to the provider environment 106. The interface layer 108 in this example can also include other components as well, such as at least one web server, routing components, load balancers, and the like. When a request to access resources of the provider environment 106 is received at the interface layer 108 in some embodiments, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 113 in the provider environment.

The interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the web services layer and/or API service layer will be the only externally visible component, or the only component that is visible to, and accessible by, customers of the control service. The servers of the web services layer can be stateless and scaled horizontally as known in the art. API servers, as well as the persistent data store, can be spread across multiple data centers in a region, for example, such that the servers are resilient to single data center failures.

As mentioned, many networks rely on network monitoring systems such as a honeypot network to monitor inbound internet traffic. These conventional network monitoring systems typically require manually analyzing network data for information about malicious activity. Manual analysis can be time-consuming and inefficient. Further, manual analysis is susceptible to human error. Further, manual analysis can result in delays, as malicious behavior is identified only after it is discovered. In accordance with various embodiments, a network of monitoring systems can include computing elements such as computing devices 104 and 106 and other such network or electronic resources such as virtual security appliances 120 and 122, respectively.

In an embodiment, a virtual security appliance or "honeypot" can be a computing device and/or software configured to monitor and collect network data. In this example, virtual security appliances 120 and 122 can be in communication through network 105. In various embodiments, virtual security appliances 120 and 122 can be configured to offer particular functionality ("honeypot functionality"), e.g., presenting services as available on one or more ports and/or emulating the actual functionality offered by these emulated services. For example, in an embodiment, individual virtual security appliances can receive connections from various third party devices seeking to access the functionality offered by the virtual security appliances. In this situation, virtual security appliances 120 and 122 can collect information regarding these connections for storage and/or analysis.

In at least some embodiments, computing devices 104 and 106 can provide network data that is received at the interface layer 108 of the provider environment 106. A resource manager 110 or other such component can provide the data to management component 112 and/or store the network data, e.g., in network data store 116. It should be noted that in various embodiments the data can be provided directly to the management component 112 and/or other appropriate components. The management component 112 is operable to, for example, process the network data collected from the computing devices, and analyze the network data to identify an incident for reporting from the analyzed data. In this example, the network data or network activity information can include payload information, an identifier to identify the network data, timestamp information, source internet protocol (IP) address and source port of the computing device sending the network data, destination port IP address and destination port of the computing device receiving the network data, communication protocol used to interconnect computing devices, etc. The management component 112 can obtain the network data periodically and/or in response to an event.

Once the network data is obtained, the network data can be analyzed to identify network data that satisfies at least one data criterion. This can include, for example, identifying network data or port connection activity associated with connections that originate from computing devices external to the provider environment 106 attempting to connect to computing devices associated with the provider environment 106. In this way, internal and outgoing network traffic is ignored. In another example, this can include network data or port connection activity associated with a particular network connection. For example, in an embodiment, this can include analyzing network data associated with UDP and TCP connection attempts and ignoring network data associated with ICMP connection attempts.

Once the network data is identified, the identified network data can be filtered, transformed, and normalized into, for example, aggregated, time bucketed data. For example, the network data can be filtered to keep source internet protocol (IP) address information and source port information of the network device sending the network data, destination port IP address information and destination port information of the network device receiving the network data, and communication protocol information used to interconnect network devices. It should be understood that various other combinations of the network data can be utilized in accordance with various embodiments, and the example combination of network data is for illustrative purposes.

Transforming the data can include, for example, grouping data based on characteristics of the network data. For example, the network data can be sorted based on timestamp information. This can include organizing the network data in the order it was received; however, other arrangements of the network data are contemplated herein. For a particular grouping window (e.g., 10 seconds, 30 seconds, etc.), network data associated with timestamp information within the grouping window and the same network data characteristics be grouped into a single network connection. Example network characteristics can include source IP, destination IP, destination port, and protocol. For example, for a grouping window of 10 seconds, Table 1 collapses into Table 2.

TABLE 1

| ID | Time | Source IP | Source Port | Dest IP | Dest Port | Protocol |
|---|---|---|---|---|---|---|
| 1 | 2017-11-06 15:24:11 | A | 4000 | B | 100 | TCP |
| 2 | 2017-11-06 15:24:12 | C | 4001 | B | 100 | TCP |
| 3 | 2017-11-06 15:24:14 | A | 4002 | B | 100 | TCP |
| 4 | 2017-11-06 15:50:11 | A | 4003 | B | 100 | TCP |
| 5 | 2017-11-06 15:50:11 | A | 4004 | B | 100 | UDP |

TABLE 2

| ID | Time | Source IP | Source Port | Dest IP | Dest Port | Protocol |
|---|---|---|---|---|---|---|
| 1 | 2017-11-06 15:24:11 | A | 4000 | B | 100 | TCP |
| 2 | 2017-11-06 15:24:12 | C | 4001 | B | 100 | TCP |
| 4 | 2017-11-06 15:50:11 | A | 4003 | B | 100 | TCP |
| 5 | 2017-11-06 15:50:11 | A | 4004 | B | 100 | UDP |

In this example, Table 1 and Table 2 include network connection information or other such attribute data, including, for example, identification information identifying individual network connections, timestamp information for individual network connections, source IP and source port information for individual network connections, destination IP and port information for individual network connections, and protocol information for individual network connections. In this example, row 3 of Table 1 can be collapsed into row 1 of Table 1 because the network characteristics associated with the network connections are the same and the timestamp information for the network connections falls within a grouping window (e.g., a 10 second window). In this example, row 2 is not collapsed because it is associated with a different source IP, row 4 is not collapsed because the timestamp information is outside the grouping window, and row 5 is not collapsed with row 4 because the protocols are different. The resulting grouping is illustrated in Table 2. It should be apparent to those skilled in the art that the connections that are grouped can vary based on a selected grouping window and network characteristics. Accordingly, the grouping window and grouping characteristics can be indicated by at least one authorized user or by utilizing an automated approach. Further, in this example, although the same network characteristics are required for grouping network connections, in some embodiments, ranges of values for the network characteristics can be utilized for grouping network connections. For example, network connections are not grouped based on whether the network connections have the same network characteristics but are instead grouped based on whether network connections are within selected ranges of values for the network characteristics.

Once the network connections are grouped, network data for a particular port across the security appliances for a particular period of time can be aggregated. For example, for a specified period of time (e.g., 5 minutes, 30 minutes, etc.), the total number of connections to a given port across the security appliances within the specified period of time is determined by summing the number of connections, grouping by source IP, destination port, and protocol. In an embodiment, the total number of connections can be normalized by the number of active security appliances capable of obtaining network data during the period of time. Advantageously, such an approach reduces false detection of connection volume increases when comparing to different times in which there are a different number of security appliances active and obtaining network data. Thereafter, the aggregated network data can be stored, for example, in network datastore 116.

Management component 112 or other such component can analyze the aggregated network data to detect one of a number of events. In various embodiments, events can include a port volume increase anomaly, a port classification change anomaly, or other such anomaly. A notification component 114 is operable to, for example, generate an alert, alarm or other such notification concerning the identified event or otherwise suspending operation of at least one operation on at least one electronic resources. In certain embodiments, the generated alert may be a written message, such as a text message, email or pop-up warning, supplied to client device 102 either directly or indirectly. In other embodiments, client device 102 may be notified about an identified incident with an audio signal. In various embodiments, notification component 114 can provide alerts on a fixed time interval. In other embodiments, notification component 114 can provide an alert upon receipt of the alert. In further embodiments of the system, the alert can be automatically provided.

In accordance with various embodiments, notification component 114 can be configured to send alerts on a schedule or on an event-driven basis. For example, alerts can be sent on a fixed time interval basis at certain times and on an immediate basis at other times, or when certain conditions are satisfied. In certain embodiments, the alert may be presented on a user interface, such as a computer or phone. An alert may include, for example, the time at which the identified incident occurred, the source of the third-party connection, a record of the data exchanged via the connection, and other relevant information. The alert can be presented in a report, collected into a plot, table, or chart, etc.

Figure 2:
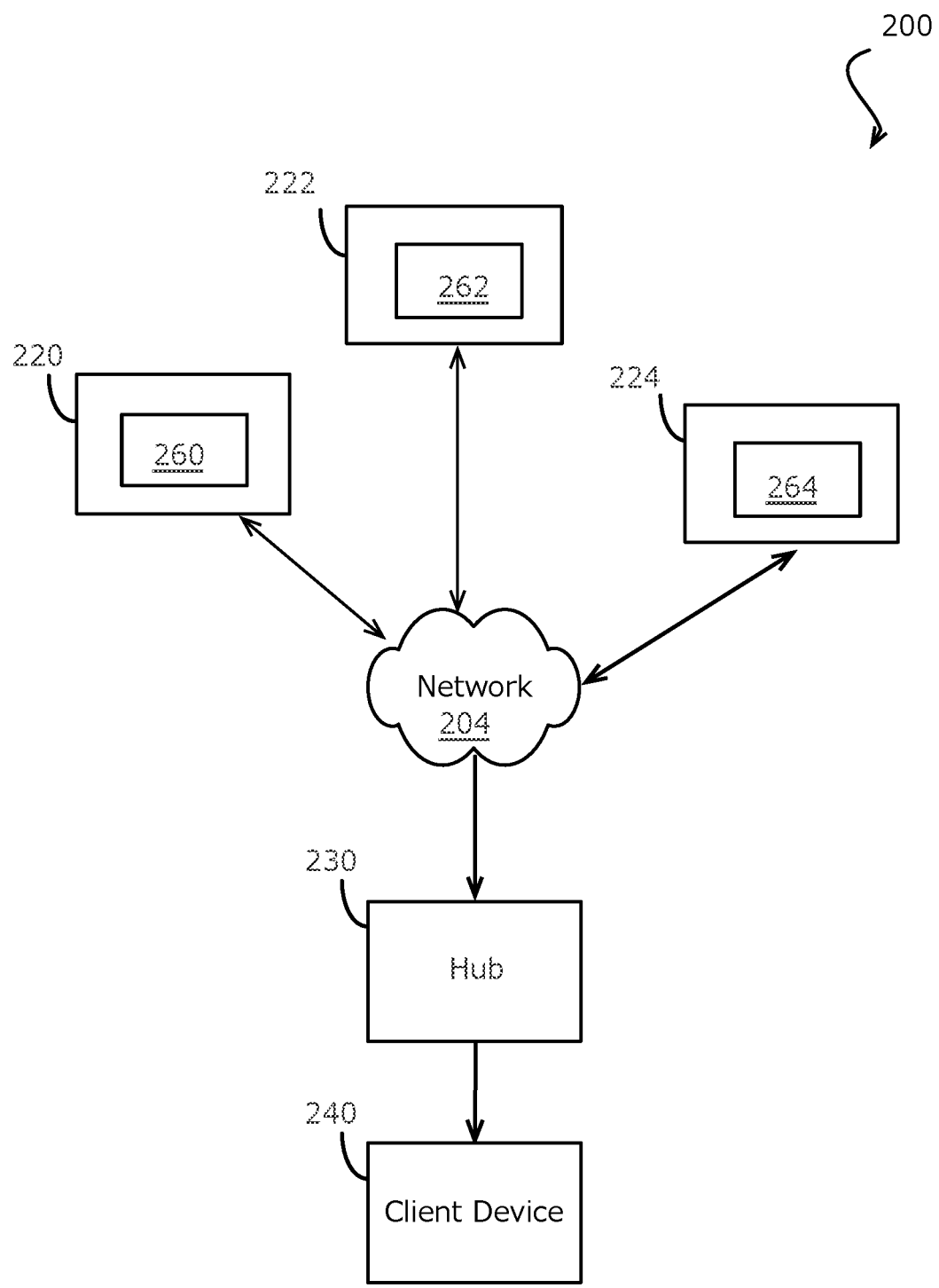
FIG. 2 illustrates a system for determining anomalous network behavior in accordance with an embodiment.

FIG. 2 illustrates an example of environment 200 for implementing aspects in accordance with various embodiments. In this example, virtual security appliances 220, 222, and 224 can accept connections from third party devices (not shown). As described, a virtual security appliance or "honeypot," can be a computing device and/or software configured to monitor and collect network data. For example, in an embodiment, individual virtual security appliances can receive connections from various third-party devices seeking to access the functionality offered by the virtual security appliances. In this way, the virtual security appliances can collect information regarding these connections for storage and/or analysis. The data can include, for example, an identifier to identify the network data, timestamp information, source internet protocol (IP) address and source port of the computing device sending the network data, destination port IP address and destination port of the computing device receiving the network data, the communication protocol used to interconnect computing devices, etc.

In this example, individual virtual security appliances 220, 222, and 224 can be associated with respective notification modules 260, 262, and 264, which may be integrated into the respective virtual security appliance or otherwise be in communication with the respective virtual security appliance. As discussed above, the virtual security modules are in communication with a single notification component (i.e., notification component 114). In this example, the notification component 114 and/or other such component may be configured to analyze the data collected from third-party connections, identify an incident for reporting from the analyzed data and may generate an alert concerning the identified incident.

The virtual security appliances or associated notification modules can communicate with hub 230 over network 204. Hub 230 can receive notifications and other such alerts at fixed or varying time intervals. For example, at least one notification module can send all alerts to hub 230 once every 24 hours. In another example, hub 230 initiates contact with a notification module and requests an update from the notification module. In yet another example, hub 230 and one or more notification modules interact on an event-driven basis. For example, in response to detecting an anomalous event by a notification module, the notification module can generate an alert concerning the identified incident and can provide that alert to the hub 230.

Once hub 230 receives at least one alert, hub 230 can provide the alert to an account of at least one authorized user. The authorized user can utilize a client device, e.g., client device 240 to view or otherwise interact or respond to the alert. The alerts can be provided on fixed time intervals, in response to receipt of an alert or other such notification, or some other delivery schedule.

In accordance with various embodiments, a virtual security appliance may be configured to send a message to an account of an authorized user at user-specified time intervals. This message may include all attribute data collected over the user-specified time interval. In other embodiments, virtual security appliances may be further configured to filter the collected attribute data and discard standard, non-anomalous attribute data. In certain embodiments, the virtual security appliances may only report anomalous attribute data. In other embodiments, hub 230 may be configured to filter attribute data collected from all virtual security appliances in environment 200.

In certain embodiments, additional notification modules may be added or deleted from environment 200. These notification modules may be added without interdependencies with other notification modules. An authorized user could choose to add an additional notification module during runtime or otherwise during a time one or more virtual security appliances are active. In a similar fashion, an authorized user could choose to remove a virtual security appliance during a time one or more virtual security appliances are active. The decision to add necessary notification modules or delete unnecessary modules may also be determined by a processor according to a predetermined schedule, the ad hoc satisfaction of one or more criteria specified by rules, or as decided by a machine learning system. In various embodiments, virtual security appliances can similarly be added or deleted without interfering with other virtual security appliances.

Figure 3:
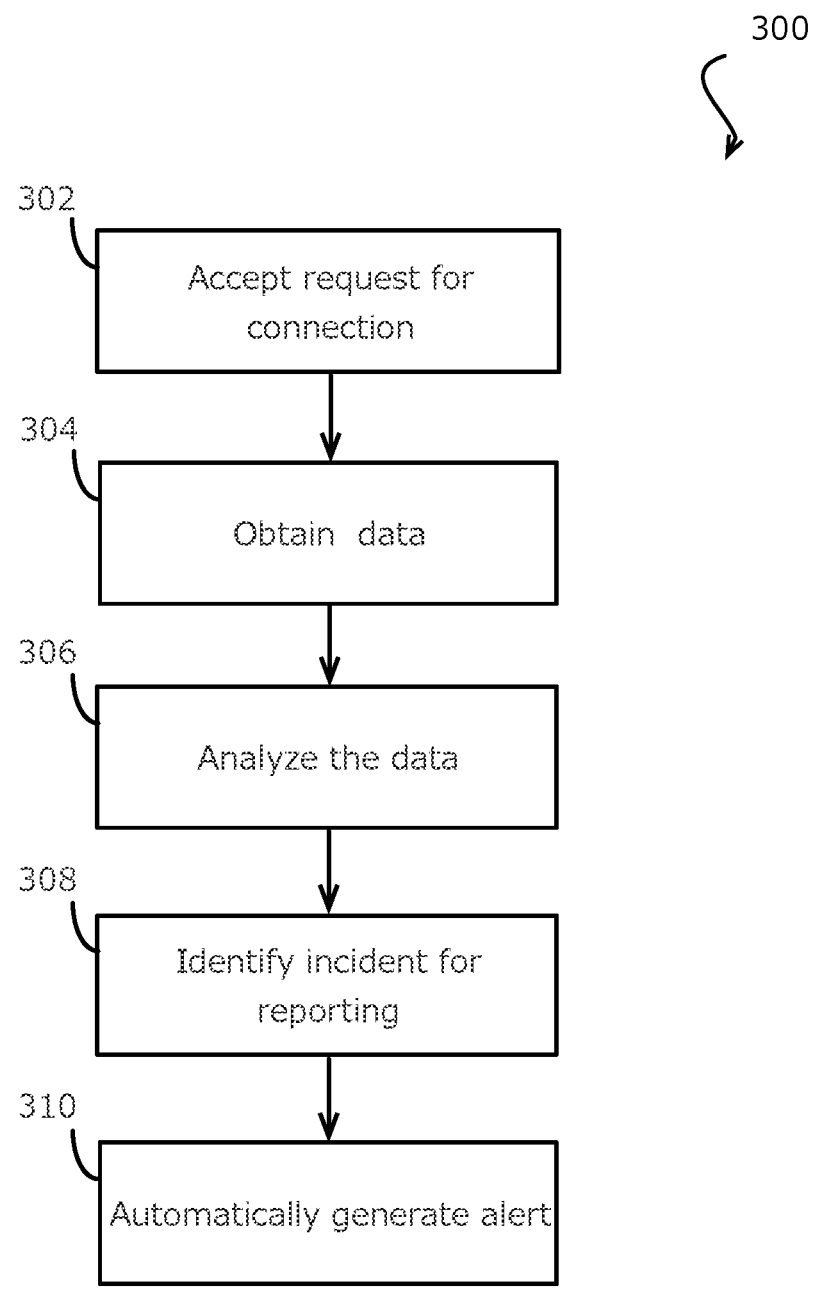
FIG. 3 illustrates an example process for determining anomalous network behavior in accordance with various embodiments.

FIG. 3 illustrates a flow diagram of an example process 300 for determining anomalous network data in accordance with various embodiments. It should be understood that for this and other processes discussed herein that there can be additional, alternative, or fewer steps performed in similar or alternate orders, or at least partially in parallel, within the scope of the various embodiments unless otherwise specifically stated. In this example, a virtual security appliance accepts 302 a request for a network connection. In response to the connection, data about the connection is obtained 304. The data is analyzed 306 to identify 308 an incident for reporting. Incidents to report include, for example, anomalies in IP ports such as a port volume increase anomaly, a port classification change anomaly, or other such anomaly.

In response to identifying an incident for reporting, an alert is automatically generated 310. The alert or other such notification may be formatted into plots, tables, or other data representation that a user could use to further analyze the data. In some embodiments, this formatting is automatically created. In other embodiments, certain notification modules are configured to generate specifically formatted messages when they detect at least one incident for reporting, based on the type and facet of data the notification module examines. In embodiments, incidents for reporting are translated into notification messages in the form of an automatically generated alert. The message may be sent out to subscribers, in certain embodiments, to notify subscribers about the discovered event. In other embodiments, a subset of individuals responsible for monitoring the detection system may receive a generated alert.

In accordance with various embodiments, steps 302, 304, 306, 308, and 310 are automatic. In some embodiments, once a notification message is sent to a subset of users, those users may forward the notification message to additional users or further investigate the notification message. The notification message may contain information about ports and payloads which are behaving anomalously. Such as in the case of a leaderboard artifact, a user may receive an automatically generated message which contains a high-level summary. In other embodiments, a user may receive an automatically generated message which only contains information or data which was determined to be anomalous. In some embodiments, the notification message is supplied to at least one user using a user interface. In some embodiments, the notification message may include the time at which the incident occurred. In other embodiments, the notification may include the time at which the incident was detected.

Figure 4:
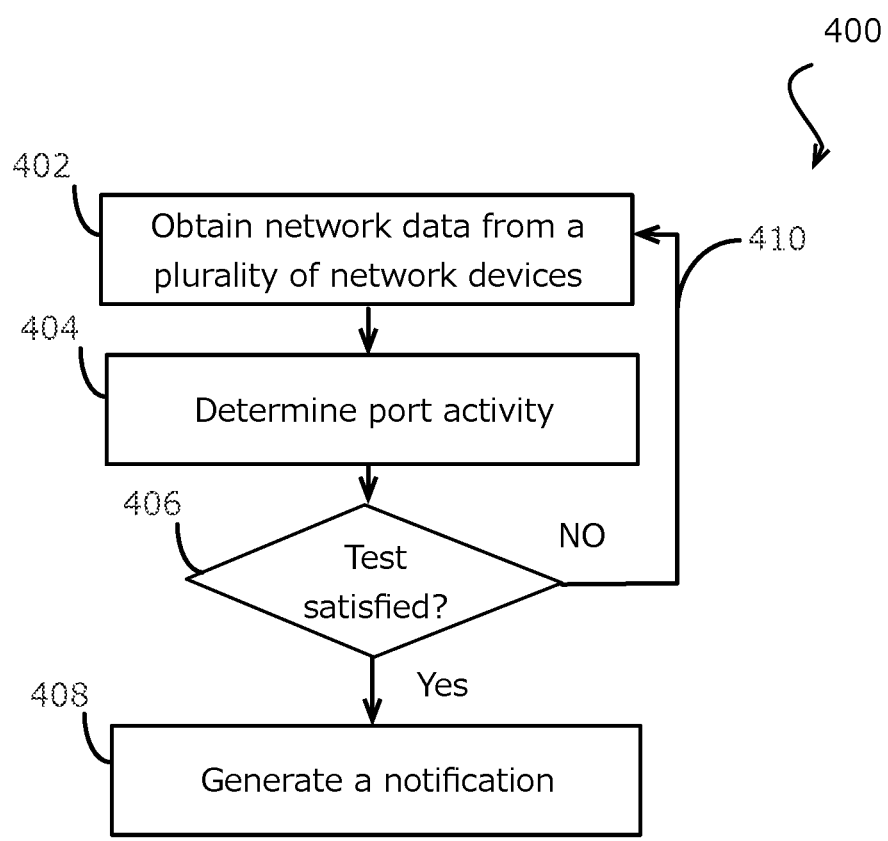
FIG. 4 illustrates an example process for determining anomalous network behavior in accordance with an alternate embodiment.

FIG. 4 illustrates a flow diagram of an example process 400 for determining anomalous network behavior in accordance with various embodiments. In this example, network activity is obtained 402 from a plurality of network devices or other such virtual security appliances in a service provider environment. The network data can be analyzed 404 to determine port connection activity with respect to at least one network device. This can include, for example, identifying relevant network data, aggregating the relevant network data, and normalizing the aggregated network data. Identifying relevant network data can include, for example, identifying data that satisfies at least one data criterion. This can include, for example, identifying network data associated with connections that originate from computing devices external to the provider environment attempting to connect to computing devices associated with the provider environment. Once the network data is identified, the identified network data is processed (e.g., filtered, transformed, normalized, etc.) to determine aggregated, time bucketed data. For example, the network data can be filtered to keep source internet protocol (IP) address information and source port information of the network device sending the network data, destination port IP address information and destination port information of the network device receiving the network data, and communication protocol information used to interconnect network devices. Transforming the data can include, for example, grouping data based on characteristics of the network data. Aggregating the data can include, for example, for a specified period of time (e.g., 5 minutes, 30 minutes, etc.), summing a total number of connections to a given port across the security appliances. Thereafter, the aggregated data can be normalized by the number of active security appliances capable of obtaining network data during the period of time. Using the aggregated, time bucketed network data, a determination 406 can be made whether the aggregated, time bucketed data satisfies at least one anomalous network behavior test. In the situation where the aggregated, time bucketed data satisfies at least one anomalous network behavior test, a notification or alert can be generated 408. In the situation where the change is within the expected behavior, the process can repeat 410.

Figure 5:
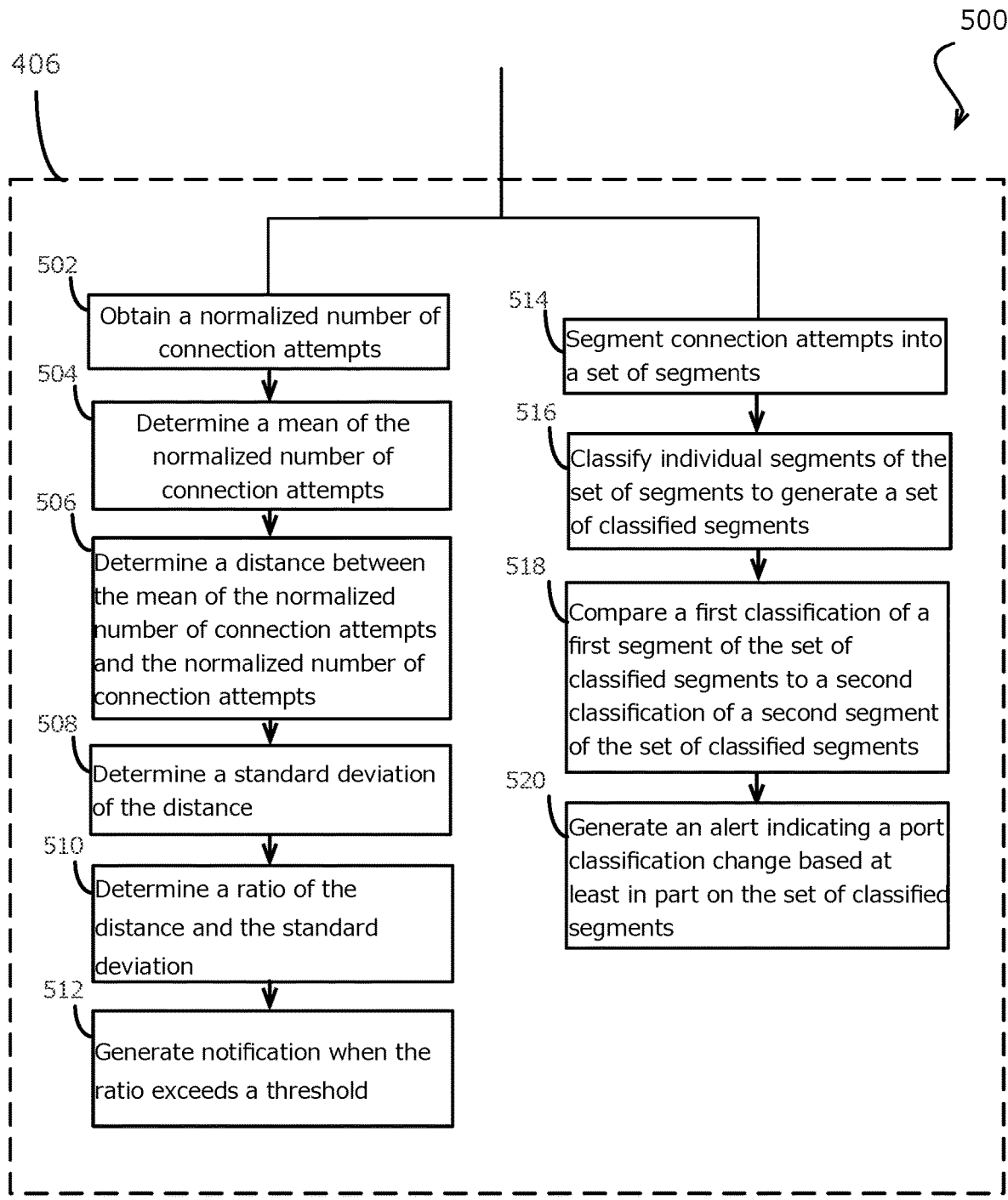
FIG. 5 illustrates an example process for testing for anomalous network behavior in accordance with various embodiments.

FIG. 5 illustrates a flow diagram of an example process 500 for determining anomalous network behavior in accordance with various embodiments. In this example, the aggregated, time bucketed data or other network data described herein is analyzed to determine whether network port connection activity satisfies at least one anomalous network behavior test as determined in step 406 of FIG. 4. In accordance with various embodiments, a first network test can be utilized to detect a port volume increase anomaly and a second network test can be utilized to detect a port classification change anomaly. It should be noted that the tests can be run in parallel or in series and various other tests can be implemented in accordance with the teachings herein. In this example for the first network test, for a port, of the plurality of electronic resources, over a period of time, a normalized number of connection attempts is obtained 502. A mean of the normalized number of connection attempts is determined 504 using a smoothing technique associated with a first rolling window of a first size. A distance between the mean of the normalized number of connection attempts and the normalized number of connection attempts is determined 506 using a distance technique. A standard deviation of the distance is determined 508 using the smoothing technique associated with a second rolling window of a second size. A ratio of the distance and the standard deviation is determined 510. In the situation where the ratio exceeds a threshold, a notification indicating a port volume increase anomaly is generated 512, as illustrated in step 408 of FIG. 4.

In accordance with an embodiment, for the second network test, for a port, of the plurality of electronic resources, over a period of time, connection attempts are segmented 514 into a set of segments. Individual segments are classified 516 to generate a set of classified segments. A first classification of a first segment of the set of classified segments is compared 518 to a second classification of a second segment of the set of classified segments. A notification indicating a port classification change is generated 520 based at least in part on the set of classified segments. For example, in the situation of comparing a first classification of a first segment of the set of classified segments to a second classification of a second segment of the set of classified segments, a notification or other such alert indicating a port classification change is generated when the first classification and the second classification are different, as illustrated in step 408 of FIG. 4.

Figure 6:
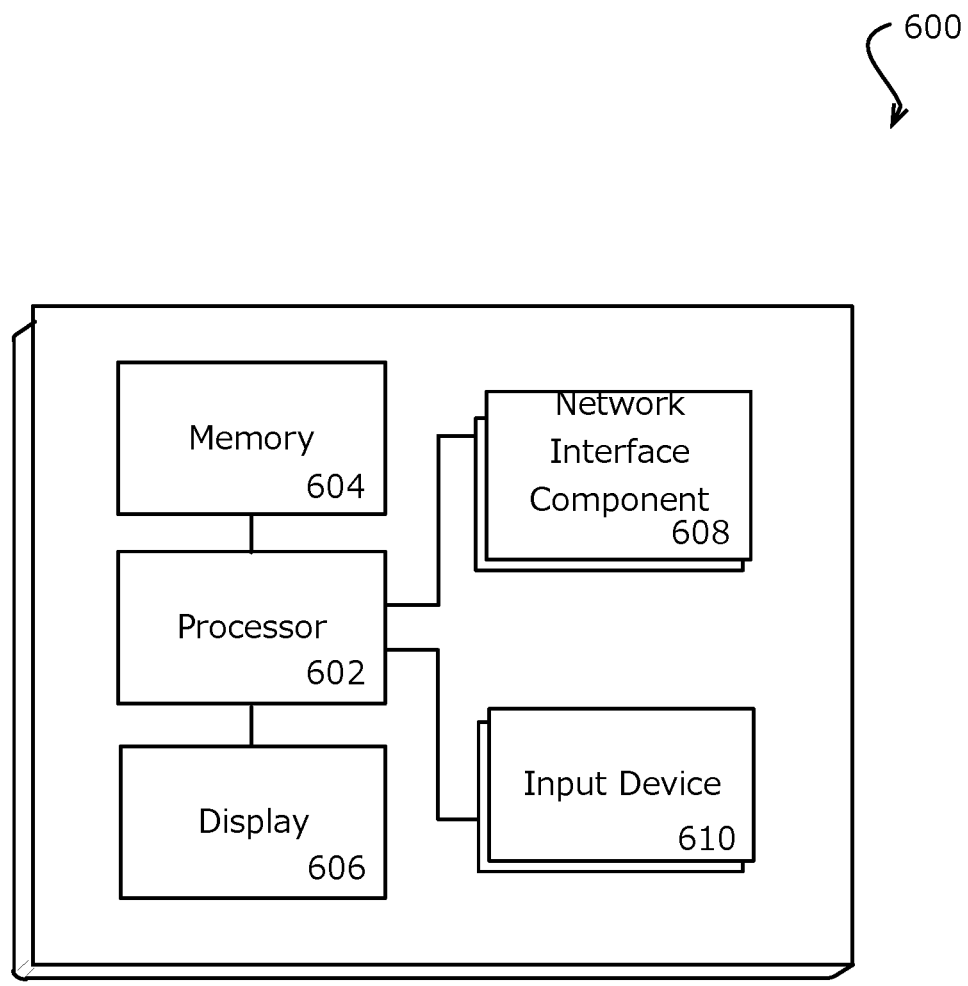
FIG. 6 illustrates example components of a computing device configured for implementing aspects in accordance with various alternate embodiments.

FIG. 6 illustrates an example set of basic components of a computing device 600, such as client device 102 and network devices 104 and 106 described with respect to FIG. 1. In this example, the device includes at least one central processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. As described herein, the instructions, when executed by the processor, can enable processor to at least obtain data from a plurality of network devices in a service provider environment, the plurality of network devices available over a network, the data including network activity information for at least one network device of the plurality of network devices, determine port connection activity with respect to at least one network device based at least in part on the data; and generate a notification when the port connection activity satisfies at least one anomalous network behavior test.

The device in some embodiments will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device can include one or more networking components 608 enabling the computing device to communicate over one or more networks, whether wired and/or wireless. The example device can also include at least one additional input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A computing system, comprising:
at least one computing device processor;
a memory device including instructions that, when executed by the at least one computing device processor, enables the computing system to:
determine port connection activity with respect to at least one network device available over a network, wherein the port connection activity includes a number of connections to a port of the at least one network device,
receive a time period grouping window,
normalize a connection count of the port connection activity by sorting the port connection activity into at least one group defined by the time period grouping window, and
generate a notification upon the normalized connection count satisfying at least one anomalous network behavior test.

2. The computing system of claim 1 wherein the computing device processor normalizes the connection count by:
receiving at least one network characteristic associated with the port connection activity, and
grouping at least two connection attempts into a single connection.

3. The computing system of claim 2, wherein the at least one network characteristic is source IP address for an individual network connection or destination IP address for an individual network connection, and the computing device groups the at least two connection attempts based on the two connection attempts having the same source IP address or the same destination address.

4. The computing system of claim 2, wherein the at least one network characteristic is a source port of an individual network connection or destination port of an individual connection, and the computing device groups the at least two connection attempts based on the two connection attempts having the same source port or the same destination port.

5. The computing system of claim 2 wherein the at least one network characteristic refers to a protocol used in the network connection, and the computing device groups the at least two connection attempts based on the two connection attempts using the same protocol.

6. The computing system of claim 2 wherein the computing device groups the at least two connection attempts based on the two connection attempts each having a network characteristic within a selected range of values.

7. The computing system of claim 1 wherein the instructions, when executed by the at least one computing device processor, further enables the computing system to aggregate the data across the plurality of network devices.

8. A computer-implemented method for detecting anomalous network behavior, the method comprising:
determining port connection activity with respect to at least one network device available over a network, wherein the port connection activity includes a number of connections to a port of the at least one network device,
receiving a time period grouping window,
normalizing a connection count of the port connection activity by sorting the port connection activity into at least one group defined by the time period grouping window, and
generating a notification upon the normalized connection count satisfying at least one anomalous network behavior test.

9. The computer-implemented method of claim 8, wherein normalizing the connection count includes:
receiving at least one network characteristic associated with the port connection activity, and
grouping at least two connection attempts into a single connection.

10. The computer-implemented method of claim 9, wherein the at least one network characteristic is source IP address for an individual network connection or destination IP address for an individual network connection, and the computing device groups the at least two connection attempts based on the two connection attempts having the same source IP address or the same destination address.

11. The computer-implemented method of claim 9, wherein the at least one network characteristic is a source port of an individual network connection or destination port of an individual connection, and the computing device groups the at least two connection attempts based on the two connection attempts having the same source port or the same destination port.

12. The computer-implemented method of claim 9, wherein the at least one network characteristic refers to a protocol used in the network connection, and the computing device groups the at least two connection attempts based on the two connection attempts using the same protocol.

13. The computer-implemented method of claim 9 wherein the computing device groups the at least two connection attempts based on the two connection attempts each having a network characteristic within a selected range of values.

14. The computer-implemented method of claim 9 wherein the instructions, when executed by the at least one computing device processor, further enables the computing system to aggregate the data across the plurality of network devices.

15. A non-transitory computer readable storage medium storing instructions that, when executed by at least one processor of a computing system, enables the computing system to:
- determine port connection activity with respect to at least one network device available over a network, wherein the port connection activity includes a number of connections to a port of the at least one network device,
- receive a time period grouping window,
- normalize a connection count of the port connection activity by sorting the port connection activity into at least one group defined by the time period grouping window, and
- generate a notification upon the normalized connection count satisfying at least one anomalous network behavior test.

16. The non-transitory computer readable storage medium of claim 15 wherein the computing device processor normalizes the connection count by:
- receiving at least one network characteristic associated with the port connection activity, and
- grouping at least two connection attempts into a single connection.

17. The non-transitory computer readable storage medium of claim 16, wherein the at least one network characteristic is source IP address for an individual network connection or destination IP address for an individual network connection, and the computing device groups the at least two connection attempts based on the two connection attempts having the same source IP address or the same destination address.

18. The non-transitory computer readable storage medium of claim 16, wherein the at least one network characteristic is a source port of an individual network connection or destination port of an individual connection, and the computing device groups the at least two connection attempts based on the two connection attempts having the same source port or the same destination port.

19. The non-transitory computer readable storage medium of claim 16, wherein the at least one network characteristic refers to a protocol used in the network connection, and the computing device groups the at least two connection attempts based on the two connection attempts using the same protocol.

* * * * *